(12) United States Patent
Ullrich

(10) Patent No.: US 9,234,148 B2
(45) Date of Patent: Jan. 12, 2016

(54) PROCESS AND APPARATUS FOR THE UTILIZATION OF THE ENTHALPY OF A SYNGAS BY ADDITIONAL AND POST-GASIFICATION OF RENEWABLE FUELS

(75) Inventor: Norbert Ullrich, Essen (DE)

(73) Assignee: THYSSENKRUPP INDUSTRIAL SOLUTION AG, Essen (DE)

( * ) Notice: Subject to any disclaimer, the term of this patent is extended or adjusted under 35 U.S.C. 154(b) by 1015 days.

(21) Appl. No.: 13/138,542

(22) PCT Filed: Feb. 26, 2010

(86) PCT No.: PCT/EP2010/001180
§ 371 (c)(1),
(2), (4) Date: Nov. 10, 2011

(87) PCT Pub. No.: WO2010/099896
PCT Pub. Date: Sep. 10, 2010

(65) Prior Publication Data
US 2012/0055087 A1   Mar. 8, 2012

(30) Foreign Application Priority Data

Mar. 4, 2009   (DE) .......................... 10 2009 011 174
Feb. 17, 2010  (DE) .......................... 10 2010 008 384

(51) Int. Cl.
*C10J 3/48*   (2006.01)
*C10J 3/46*   (2006.01)
(Continued)

(52) U.S. Cl.
CPC  *C10J 3/487* (2013.01); *C10J 3/506* (2013.01); *C10J 3/721* (2013.01); *C10J 3/84* (2013.01);
(Continued)

(58) Field of Classification Search
CPC combination set(s) only.
See application file for complete search history.

(56) References Cited

U.S. PATENT DOCUMENTS 3,782,913 A    1/1974  Donath
3,971,639 A *  7/1976  Matthews ....................... 48/202
(Continued)

FOREIGN PATENT DOCUMENTS

CA    2 306 889 C   12/2008
DE    2312283 A1   10/1973
(Continued)

OTHER PUBLICATIONS

Choren Industries; "Beta Plant experience and lessons learnt so far ..."; Oct. 15, 2008; BTL Congress; XP008131226.
(Continued)

*Primary Examiner* — Kaity Handal
(74) *Attorney, Agent, or Firm* — Lathrop & Gage LLP

(57) ABSTRACT

A process for the generation of a syngas in an entrained-flow gasification process includes a solid, carbon-containing fuel which is introduced via burners into a reactor which also supplies the oxygen for gasification. The fuel is introduced on a burner level where the burners are arranged concentrically around the reaction chamber or in the head area. The syngas obtained is discharged from the reaction chamber via a discharge nozzle, so that the syngas is passed into a collecting chamber for cooling by addition of low-temperature gaseous, vaporous or liquid cooling agents. A quench chamber is provided between the reactor and the collecting chamber. Additional burner levels are in the quench chamber via which a fuel material of renewable fuels or biofuels is introduced into the syngas, so that the heat enthalpy of the syngas can be utilized for the endothermic gasification reaction of the biological raw material. An apparatus for this generation of synthesis gas includes several burner levels, the renewable fuel being supplied to the gasification chamber with or without water vapor or oxygen and the enthalpy of the hot syngas being utilized for the gasification of the renewable fuel.

12 Claims, 3 Drawing Sheets

(51) Int. Cl.
*C10J 3/50* (2006.01)
*C10J 3/72* (2006.01)
*C10J 3/84* (2006.01)
*C10K 1/04* (2006.01)
*C10K 1/10* (2006.01)

(52) U.S. Cl.
CPC . *C10K 1/04* (2013.01); *C10K 1/101* (2013.01); *C10J 2200/152* (2013.01); *C10J 2300/0916* (2013.01); *C10J 2300/1609* (2013.01)

(56) References Cited

U.S. PATENT DOCUMENTS

| | | | |
|---|---|---|---|
| 4,069,024 A * | 1/1978 | Fernandes | 48/197 R |
| 4,402,710 A * | 9/1983 | Stellaccio | 48/197 R |
| 4,647,294 A | 3/1987 | Jahnke | |
| 4,676,805 A * | 6/1987 | Richter et al. | 48/197 R |
| 4,773,917 A | 9/1988 | Morihara et al. | |
| 4,781,731 A * | 11/1988 | Schlinger | 48/197 R |
| 5,324,336 A * | 6/1994 | Child | 44/608 |
| 5,849,050 A | 12/1998 | Wolf | |
| 6,033,456 A * | 3/2000 | Jahnke | 75/505 |
| 6,960,234 B2 * | 11/2005 | Hassett | 48/77 |
| 7,776,114 B2 | 8/2010 | Rueger et al. | |
| 8,460,410 B2 * | 6/2013 | Tsang et al. | 48/197 R |
| 2002/0159929 A1 * | 10/2002 | Kaneko et al. | 422/190 |
| 2007/0163176 A1 * | 7/2007 | Ruger et al. | 48/210 |
| 2008/0209807 A1 * | 9/2008 | Tsangaris et al. | 48/89 |
| 2009/0038222 A1 * | 2/2009 | Douglas et al. | 48/73 |
| 2009/0305355 A1 * | 12/2009 | Henriksen et al. | 435/72 |
| 2011/0010992 A1 | 1/2011 | Kowoll | |

FOREIGN PATENT DOCUMENTS

| | | |
|---|---|---|
| DE | 10 2008 049 716 A1 | 4/2010 |
| EP | 0 745 114 B1 | 3/1999 |
| EP | 1 027 407 B1 | 4/2001 |
| EP | 1 749 872 A2 | 2/2007 |
| EP | 1 918 352 A1 | 5/2008 |
| GB | 675918 A | 7/1952 |
| GB | 2 138 841 A | 10/1984 |
| WO | WO 2009/020809 A1 | 2/2009 |
| WO | WO 2009/118082 A2 | 10/2009 |

OTHER PUBLICATIONS

Xu Shisen; "Two-stage Dry-fed Entrained Flow Coal Gasifier"; Power Research Institute (TPRI); Oct. 16, 2007; Peoples Republic of China; XP008131225.

* cited by examiner

PROCESS AND APPARATUS FOR THE UTILIZATION OF THE ENTHALPY OF A SYNGAS BY ADDITIONAL AND POST-GASIFICATION OF RENEWABLE FUELS

BACKGROUND OF THE INVENTION

The invention relates to a process for the gasification of solid, finely ground carbon-containing fuels by the use of oxygen-containing gases in an entrained-flow process at elevated pressure and a temperature above the slag melting point, in which a syngas is generated and liquid slag is separated on the walls of the gasification reactor, cooling of the high temperatures of the syngas not being achieved exclusively by adding a cooled gaseous, vaporous or liquid foreign agent or by injecting water after the syngas has been generated but by additional or post-gasification of biological or renewable fuels in the syngas flow during the generation process. The addition of renewable fuels is implemented in syngas discharge direction on at least one downstream burner level of the reaction chamber, by which it is possible to utilize the enthalpy of the hot syngas partly for the gasification of a renewable fuel. The invention also relates to an apparatus for the endothermic gasification of solid renewable fuels on a second burner level inside the reaction chamber or in the quench chamber of a cooled reactor which is enclosed in a pressure vessel.

A potential syngas generation process is the gasification of solid, carbon-containing fuels with oxygen or with oxygen-enriched air. By reaction of the fuel with the gas, the fuel usually being introduced into the reaction chamber in finely ground condition, a syngas is produced which consists of carbon monoxide and hydrogen as main components. If water vapour is added to the oxygen-containing gas, a syngas is obtained which also contains hydrogen. The fuels are typically converted in a reaction according to the entrained-flow process in the reaction chamber, in which oxygen or an oxygen-enriched gas is mixed with finely ground fuel under pressure and injected in a dust flame into the reaction chamber by means of one or more burners. In a typical embodiment of the process the temperature of the syngas thus obtained ranges between 1200 and 1600° C.

To dissipate the high temperature of the syngas quickly and efficiently and to prevent the downstream process units from caking, the syngas, once obtained, is submitted to a so-called quench process. Here, the syngas is mixed with a gaseous, vaporous or liquid substance of lower temperature or cooled by injection of water so that it is caused to dissipate its high internal enthalpy quickly and efficiently after the generation. Used as fuels are coal, coke, biomass or petroleum coke. The fuels are typically converted into a finely dispersed form by grinding prior to the gasification reaction. A typical grain size of the fuels prior to the gasification reaction ranges between 0.05 and 0.5 mm. To achieve optimum efficiency of the entrained-flow gasification, the fuel can be injected with a twist into the entrained-flow flame, which is performed by tangentially provided injection nozzles or burners with direction into the entrained-flow cloud.

For the quench process a large amount of gaseous, vaporous or liquid cooling agent or water is supplied, which can frequently be recycled only partly into the gasification process. Furthermore, a major part of the heat enthalpy of the syngas gets lost, as it is frequently necessary to recycle the cooling agent to the process by condensation and re-vaporisation. This is energy-intensive and requires a lot of equipment. It would be favourable to provide a process which uses the high internal energy of the obtained syngas in a downstream process. It is therefore the aim to provide a process which utilizes the heat enthalpy of the hot syngas for a downstream process in the entrained-flow gasification process already.

The invention achieves the aim by a process which supplies a renewable raw material to the reaction chamber via at least another burner level arranged downstream of the first burner level and which extends, in direction of the gas flow, across the rear section of the overall height of the reactor, by which another gasification reaction of the renewable raw material takes place in the reaction chamber. This reaction is endothermic so that a major part of the enthalpy inherent in the syngas can be utilized chemically for the subsequent reaction. The gasification of renewable fuels gives a low-ash syngas since vegetable raw materials contain a significantly lower portion of ash-forming combustion materials. In this way the syngas thus obtained has a considerably lower content of solids. By the downstream gasification of the renewable raw materials, the temperature of the syngas, especially in the reaction chamber, can be used and controlled energetically for cooling the gas, which results in the saving of process energy. The burners can be designed as such or as burner guns.

According to the state of the art processes for the gasification of biofuels or renewable fuels in a mixture with carbon-containing fuels are known. EP 1027407 B1 describes a process for the generation of fuel gas, syngas and reduction gas from renewable and fossil fuels by combustion in a burner with gaseous oxygen or oxygen-containing gases. When entering the reaction chamber, the fuel is caused to rotate in order to convey the mineral components, which are liquid due to the reaction temperature, from the gasification reaction towards the reactor wall and thus separate them. The gasification agent is introduced into the gasification reactor through a central opening in the bottom of the combustion chamber and forms a plunging jet. The gasifier is also supplied with a carbon-containing fuel, the feed point for the carbon-containing fuel not being described in more detail.

BRIEF SUMMARY OF THE INVENTION

The configuration of the present invention, however, requires a feed of the fuel to the reactor on two levels. This is the only way to utilize the enthalpy of the gasification of the carbon-containing fuel for the endothermic additional gasification of biofuels. As it is possible to reduce the synthesis gas temperature by the additional gasification of renewable fuels, the process can also be referred to as "chemical quench".

Especially claimed is a process for the generation of syngas by the gasification of solid, finely ground, carbon-containing fuels by the use of oxygen or an oxygen-enriched gas in an entrained-flow process under elevated pressure and at temperatures above the slag melting temperature, in which the finely ground, carbon-containing fuel in a mixture with oxygen or an oxygen-enriched gas is introduced from the outside concentrically in horizontal direction into a refractory reaction chamber so that the fuel reacts to synthesis gas in an entrained-flow gasification in the reaction chamber, and the finely ground, carbon-containing fuel is introduced into the reaction chamber on the first burner level which extends, in direction of the gas flow, across a front section of the overall height of the reaction chamber, and the syngas is obtained at a pressure of 0.1 to 8 MPa and is discharged from the reaction chamber in upward or downward direction, and after having been discharged, the syngas thus obtained is passed into a second reaction chamber which is designed as a collecting chamber and in which the supplied gas is mixed for cooling purposes with a gaseous, vaporous or liquid substance of lower temperature, and the residence time of the syngas after the introduction of the fuel in the entrained flow and before the entry into the downstream collecting chamber for cooling in the entrained flow ranges between 1 and 10 seconds, and characterised in that on a second or further burner level or a second or further burner gun level which extends across a section of the overall height of the reaction path and is arranged, in direction of the gas flow, downstream of the first burner level, a renewable fuel in a mixture with a vapour-containing or oxygen-containing gas is introduced concentrically into the reaction chamber, producing another entrained-flow gasification by which the temperature of the exiting gas is reduced and the enthalpy difference is utilized for the additional gasification of the renewable raw materials.

With regard to reaction control, especially the residence time of the fuel with oxygen or the oxygen-containing gas in the reaction chamber is of great importance. The residence time can be extended, for example, by increasing the rotating speed in the reaction chamber. In an embodiment of the invention, the residence time in the reactor after the introduction of the renewable fuel and before the entry into the downstream reaction chamber for cooling in the entrained flow in the reactor ranges between 1 and 10 seconds. This can be achieved by the tangential arrangement of the burner or the burners in the reaction chamber. In an especially preferred embodiment the residence time of the syngas after the introduction of the biofuel and before the entry into the downstream collecting chamber for cooling in the entrained flow in the reactor ranges between 2 and 5 seconds. The reaction can also be controlled by adding water vapour so that the fuel is introduced into the reaction chamber in a mixture with a vapour-containing or oxygen-containing gas, water vapour, or an oxygen-containing gas and water vapour. The oxygen-containing gas, for example, may be air.

It is possible to increase the residence time of the fuel in the reaction chamber by especially changing the burner alignment in order to intensify the tangential twist. If the fuel is introduced via tangentially arranged burners of the first or second burner level or of both burner levels tangentially to the cylindrical reaction chamber, the entrained flow into the reaction chamber is given a twist which will increase the residence time of the fuel in the entrained-flow gasification. In this way, the gasification reaction can be optimised.

In another embodiment of the invention, the vertical height of the first burner level accounts for 10 percent of the height of the overall reaction chamber and accommodates 1 to 6 burners. In a further embodiment of the invention, the vertical height of the second burner level also accounts for 10 percent of the height of the overall reaction chamber and accommodates 1 to 4 burners. Between the burner levels there may be a burner-free level of random width. Referred to as a burner level is a configuration of burners arranged in a concentric circle around the cylindrical reaction chamber, the injection of the fuel being carried out in horizontal direction. It is not required to arrange the burners precisely at the same height but an arrangement at the same height will be of advantage if an optimum gasification is to be achieved. The burners are preferably arranged so to allow tangential injection of the fuel into the reaction chamber.

The temperature of the gasification reaction is significantly reduced in the course of the gas flow by the addition of renewable fuel. Typically the temperature during the gasification reaction ranges between 1400 and 2000° C. By the addition of renewable fuel, the gasification temperature before exiting the reaction chamber in the flame declines to a notable extent. The flame temperature downstream of the feed point for the renewable fuel ranges between 1400° C. and 1600° C. Typical pressures for the performance of the gasification reaction range between 0.1 and 8 MPa. Preferred pressures for the performance of the gasification reaction range between 1 and 4 MPa. To carry out the reaction, the water vapour-containing or oxygen-containing reaction gas is compressed to the required pressure by means of compressors. Typically, 5 to 40 percent of the overall fuel is gasified on the second burner level. However, this is a guide value only. The carbon-containing fuel can be introduced into the reaction chamber through feed devices tangentially arranged on the first burner level so that the carbon-containing fuel is provided with a twist by which the residence time of the fuel inside the reactor will increase.

In many embodiments, a discharge tube connects the gasification reactor with a quench chamber where the hot syngas is mixed with a gaseous or vaporous foreign substance of lower temperature. In an embodiment of the process it is possible to introduce the renewable fuel concentrically into the quench chamber. This takes place through openings which are arranged in the quench chamber. This brings about a further reaction with the syngas by which the temperature of the syngas is further reduced. In this way, the heat enthalpy of the syngas is utilized for further gasification. This is possible because at this point the oxygen content of the syngas is sufficient for a post-gasification. If required, it is also possible to increase the oxygen content in the reaction gas.

To carry out the post-gasification, it is generally possible to first inject the gaseous, vaporous or liquid agent for quenching into the quench chamber and then introduce the renewable raw material in gas flow direction. This will only be possible, however, if the quench process does not cool down the syngas too much. In a preferred embodiment, the renewable raw material is, for this reason, introduced into the quench chamber first and then the syngas is quenched. The renewable fuel can be injected into both the reaction vessel and the quench chamber.

It is also possible to introduce the renewable raw material into the quench chamber in a mixture with a finely ground, carbon-containing fuel. In this way it is also possible to influence the temperature of the syngas in the quench chamber, as the temperature in the syngas further increases with rising carbon content of the fuel depending on the residual oxygen portion. The injection of the fuel into the quench chamber can, for example, also be performed via several levels or with a twist.

In this embodiment, the renewable fuel is introduced into the reaction chamber or the quench chamber by tangentially arranged feed devices so to provide the renewable fuel with a twist which will increase the residence time of the renewable fuel in the reactor or quench chamber. This will intensify the efficiency of the gasification reaction. After the introduction of the renewable fuel into the quench chamber the temperature of the syngas will typically still range between 1100 and 1300° C.

As fuels for the first burner level of the reactor especially carbon-containing fossil fuels can be used. These are, for example, coal, coke, petroleum coke or bitumen. The fuels are finely ground before being used in the gasification. As fuels for the second burner level or the burner level of the quench chamber, all biofuels or renewable fuels can be used.

These are in particular shredded, finely ground energy plants, wood of any type, straw, grass, cereals, biological residues, ocean plants or cattle dung. Such fuels are usually pre-treated for the gasification.

The pre-treatment includes especially a grinding process. It may also include additional drying steps, pressing operations, torrefaction or carbonising steps. Torrefaction generally refers to the thermal treatment of biomass under air-exclusion conditions at relatively low temperatures of 200 to 300° C. It is also possible to use a combination of these process steps. Depending on the requirements, the renewable raw materials for the second burner level or the burners of the quench chamber may also be mixed with carbon-containing, fossil fuels. It is also possible to supply the first and the second burner level with a mixture of carbon-containing or renewable fuels. The mixing ratios of the burner levels may also be different. With suitable reaction parameters it is thus possible to control the temperature of the syngas via the mixing ratio of carbon-containing fuel to renewable fuel on the second level of the reaction vessel or on the further burner levels of the quench chamber.

As foreign substances for cooling the syngas it is possible to use especially water, water vapour or recycled and cooled syngas. However, it is also possible to use foreign gases such as nitrogen or carbon dioxide.

The invention also relates to an apparatus for the performance of gasification reactions with downstream introduction of biofuels into the gasifier. It typically includes a pressure gasification reactor which is a reaction chamber enclosed in a pressure-tight jacket vessel. Use is made of a gasification reactor which is in accordance with the state of the art. Suitable embodiments are, for example, mentioned in WO 2009118082 A1.

Especially claimed is an Apparatus for the utilization of the enthalpy of a syngas by additional and post-gasification of renewable fuels,
   this apparatus consisting of a refractory reaction chamber suitable for the gasification of solid, carbon-containing fuels by reaction with an oxygen-containing or water vapour-containing and oxygen-containing gas, and
   this refractory reaction chamber containing one or several burners which are arranged concentrically on one burner level and by which a fuel can be introduced in horizontal direction into the reaction chamber or from the head area, and
   a second chamber following this reaction chamber in vertical direction leading downwards or upwards, configured as a collecting chamber and equipped with feed devices for gaseous, vaporous or liquid cooling agents, and characterised in that
   between the first burner level in the reaction chamber and the collecting chamber there are additional burners which are also arranged concentrically on one burner level and by which a renewable fuel can be introduced in horizontal direction into the reaction chamber.

The reaction chamber comprises feed devices for fuel and the reaction gas. The apparatus according to the invention may be designed such that it is possible to discharge the generated syngas from the reaction chamber in downward or upward direction. A second burner level for supplying renewable fuels is provided downstream of the first burner level in direction of the gas flow. In both cases the second burner level is located between the first burner level and the quench chamber for cooling.

In an embodiment of the invention, the vertical height of the first burner level accounts for 10 percent of the height of the overall reaction chamber and accommodates 1 to 6 burners. In a further embodiment of the invention, the vertical height of the second burner level also accounts for 10 percent of the height of the overall reaction chamber and accommodates 1 to 4 burners. Between the burner levels there may be a burner-free level of random width. Referred to as a burner level is a configuration of burners arranged in a concentric circle around the cylindrical reaction chamber, the injection of the fuel being carried out in horizontal direction. It is not required to arrange the burners precisely at the same height but an arrangement at the same height will be of advantage if an optimum gasification is to be achieved.

It is also possible to integrate another burner level in the upper section of the reaction chamber, this burner level being preferably located in the head area of the reaction chamber and injecting the fuel from above in vertical or approximately vertical direction into the reaction chamber. On the second burner level for the injection of the renewable fuel the burners are also advantageously arranged concentrically on one burner level. On this burner level there are typically 1 to 4 burners.

The burners may be of random design but are to allow the injection of finely dispersed fuel into the reaction chamber. They are preferable designed as burner guns or nozzles. These serve to inject the fuel in a mixture with an oxygen-containing gas. The burners of the first level are preferably nozzles which inject the fuel in a mixture with an oxygen-containing gas.

The burners of the first burner level may be arranged such that they are aligned tangentially to the cylindrical burner wall which will provide the entrained flow with a twist. The burners of the second burner level may as well be aligned tangentially to the cylindrical burner wall so that the entrained flow will get another twist downstream of the first burner level when carrying out the gasification reaction.

By special devices, the burners may be protected from flowing, red-hot liquid slag. In slag flow direction upstream of the burners of the second burner level, for example, there is at least one cooled slag deflector which protects the burners from the red-hot liquid slag flowing down the wall. This may, for instance, be a steel apron installed upstream of the burners in flow direction of the slag and which is provided with indirect cooling and protects the burners from red-hot liquid slag flowing down with the gas flow. Also suitable are ceramic projections or brickwork. The burners of the second burner level may also be arranged in a burner recess. At the bottom, the reaction chamber is provided with a discharge nozzle for the hot syngas provided the syngas is discharged in vertical direction.

If the reaction gas is discharged downwards from the reaction chamber, there is a collecting chamber for the syngas below the reaction chamber in a typical embodiment. In another embodiment, there is a discharge tube between the collecting chamber and the quench chamber, by which a vertical quench chamber is formed. Both the collecting chamber and the quench chamber may be provided with feed devices for gaseous, vaporous or liquid cooling agents.

The mentioned chambers may also include a spray quench, a water quench or a water bath. The water quench may, for example, be provided as a water film which, when getting into contact with the obtained useful gas, cools it down. The collecting chamber is then fitted with one or several discharge nozzles for the obtained syngas. In the below water bath the solid materials accumulated during the gasification are collected and discharged from the reaction chamber also via one or several nozzles.

Into the quench chamber, which is located between the reaction vessel and the collecting chamber, renewable fuels can also be introduced concentrically according to the invention. One embodiment, for this purpose, provides the quench chamber with concentrically arranged burners via which it is possible to introduce a renewable fuel horizontally into the quench chamber. The renewable raw material may also be introduced into the quench chamber in a mixture with a finely ground, carbon-containing fuel. In this way it is also possible to influence the temperature of the syngas in the quench chamber, as the temperature in the syngas further increases with rising carbon content of the fuel depending on the residual oxygen portion.

These burners can also be protected from the flowing-down red-hot liquid slag by projections or recesses. Hence it is possible, for example, to provide the wall of the reaction chamber with a projection at the outlet for the syngas so that the feed burners for renewable raw material in the quench chamber are installed in the flow shadow of the projection.

To increase the residence time and the mixing efficiency, the burners may also be arranged tangentially to the cylindrical burner wall so that the fuel is introduced tangentially into the quench chamber. This gives a twist to the fuel in the quench chamber, thus increasing the residence time of the renewable fuel in the quench chamber. The introduction or injection is implemented under pressure using a foreign gas, for example. In the quench chamber as well the burners may be arranged on several levels. The fuel can thus be injected into the quench chamber from several levels. The burners of the second level in the reaction chamber or the further levels are preferably designed as nozzles which inject the fuel in a mixture with an oxygen-containing gas.

Below the discharge nozzle there is a water bath for the accumulated solids, which is suited for collecting and cooling the accumulated solid material from a coal gasification reaction. The bath may be fitted with discharge devices for the cooled solids. Above the water bath for collecting the solids and below the feed devices for the gaseous, vaporous or liquid foreign substances there is typically a discharge nozzle for cooled syngas. This discharge nozzle is provided laterally so that the syngas and gaseous reaction products are withdrawn in lateral direction.

The apparatus according to the invention and the process according to the invention involve the advantage of reducing the temperature of a syngas generated by coal gasification utilizing the excessive heat enthalpy by additional gasification of renewable fuels. By the process according to the invention the enthalpy of a gasification reaction can be utilized much more efficiently. It is also possible to achieve a combined gasification of coal and renewable raw material and at the same time reduce the ash content of the syngas obtained.

BRIEF DESCRIPTION OF THE DRAWINGS

The configuration of an apparatus for the generation of gases according to the invention is illustrated in more detail by means of four drawings, the process according to the invention not being limited to these embodiments.

DETAILED DESCRIPTION OF THE INVENTION

Figure 1:
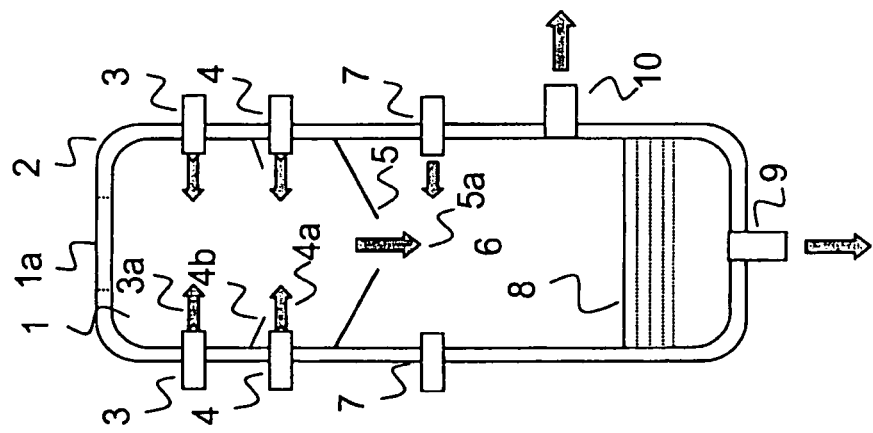
FIG. 1 shows a gasification reactor according to the invention for the additional gasification of renewable fuels.

FIG. 1 shows a reactor for the additional gasification of renewable fuels. Into a cooled reaction chamber (1) with head (1a) which is enclosed in a pressure-tight jacket vessel (2) a carbon-containing fuel is introduced under pressure in a mixture with water vapour or an oxygen-containing gas (3a) for the gasification of solid, carbon-containing fuels. The carbon-containing, solid and finely ground fuel is introduced with an oxygen-containing reaction gas into the combustion chamber via burners or burner guns (3), the burners being provided in a horizontal and concentric arrangement. The number of burners on the burner level ideally ranges between 1 and 6. Via burners or burner guns (4) installed on a further burner level downstream of the first burner level a finely ground renewable fuel (4a) is introduced in a mixture with water vapour-containing or oxygen-containing gas into the combustion chamber of the reaction chamber for the gasification of solid carbon-containing fuels. This arrangement provides for an entrained-flow gasification which converts the fuel into syngas during a residence time of 1 to 10 seconds. The burners of the second burner level are protected from down-flowing red-hot liquid slag by cooled slag deflectors (4b). By the endothermic gasification of the renewable raw material, the temperature of the syngas exiting the reaction chamber (5a) is significantly reduced. The syngas is withdrawn from the reaction chamber (1) via a discharge nozzle (5) and transferred to a reaction chamber for cooling (6) where it is mixed with a gaseous, vaporous or liquid foreign substance of lower temperature or water supplied through feed nozzles (7). The accumulated solids are passed into a water bath (8), cooled and after cooling removed via a discharge nozzle (9). The syngas obtained is removed via a lateral discharge nozzle (10).

Figure 2:
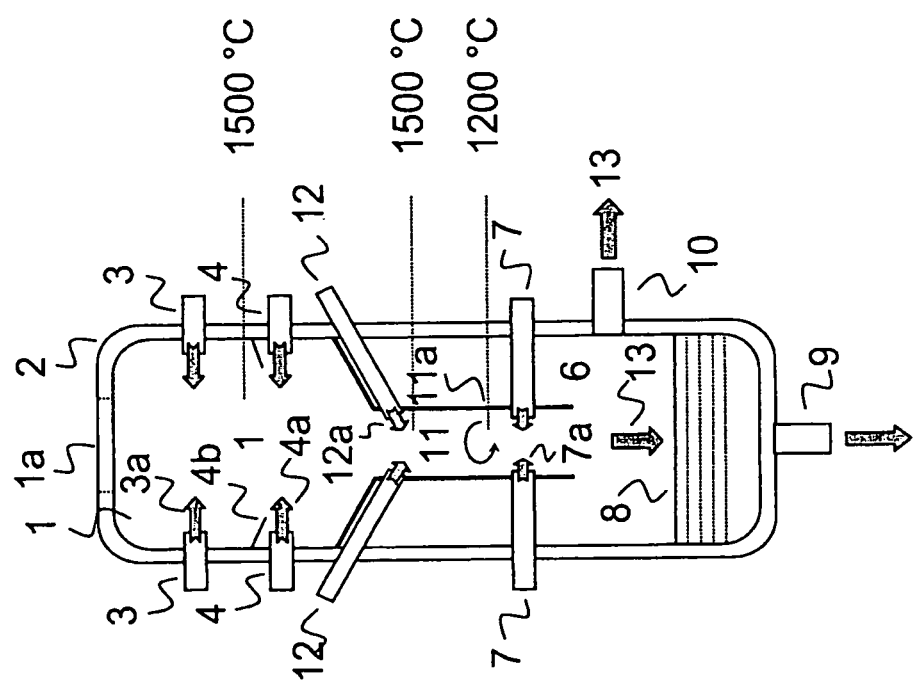
FIG. 2 shows a gasification reactor according to the invention for the additional and post-gasification of renewable fuels, in the case of which renewable fuel is introduced into the quench chamber.

FIG. 2 shows the same reactor with a discharge tube housing further burners. The syngas exits the reaction chamber (1) via a discharge tube (11a). The discharge tube (11a) extends into a quench chamber (11) provided for cooling. In the inlet section of the quench chamber (11) there is a feed nozzle or burner for renewable fuel (12). In accordance with the invention the renewable fuel (12a) is introduced at this point via feed nozzles (12). This fuel reacts with the syngas in the quench chamber (11). By the endothermic gasification of the renewable raw material, the temperature of the syngas in the quench chamber (11) is decreased to a significant degree. In the inlet section of the quench chamber (11) the temperature typically is 1500° C., whereas the temperature is 1200° C. after the reaction. Subsequently a vaporous, gaseous or liquid foreign agent (7a) is introduced via a feed nozzle (7). The syngas (13) is transferred into a collecting chamber (6) for cooling. The accumulated solids are passed into a water bath (8), cooled and after cooling removed via a discharge nozzle for solids (9). The syngas (13) obtained is discharged via a lateral discharge nozzle (10) for syngas (13).

Figure 3:
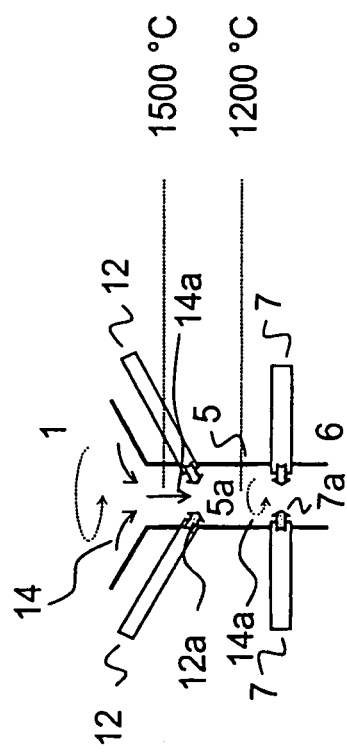
FIG. 3 shows the bottom part of the reaction chamber with quench chamber.

FIG. 3 shows the discharge tube (11a) through which the syngas exits the reaction chamber (1) and which forms a quench chamber (11). The reaction chamber (1) serves to carry out an entrained-flow gasification. In this embodiment the syngas in the reaction chamber is of a twisted flow direction (14) and leaves the reaction chamber (1) after an average residence time of 1 to 10 seconds. The syngas flow leaves the gasification reactor (1) in vertical, downward direction (14a) and enters the quench chamber (11). According to the invention a renewable fuel (12a) is introduced into the hot syngas shortly after it has left the reaction chamber (1). At the end of the reaction path a foreign agent (7a) is added for cooling.

Figure 4:
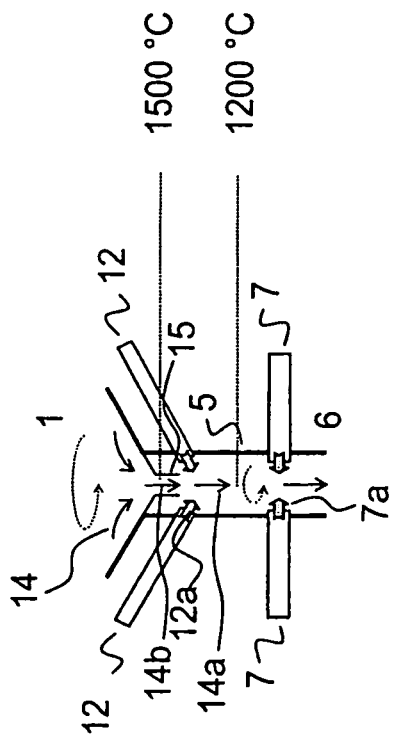
FIG. 4 shows the bottom part of the reaction chamber with quench chamber and a wall projection.

FIG. 4 shows the same discharge tube (11a) which, in this embodiment, is provided with a wall projection (15) in the reaction chamber (1), which forms a restriction at the feed point of the syngas flow (14b) into the quench chamber. In this way the flow velocity into the quench chamber (11) is increased. In the flow shadow of this wall projection, the renewable fuel (12a) is introduced. This typically serves to achieve a better mixing efficiency of the fuel with the syngas. In addition, the burners are protected from being covered with red-hot liquid slag. At the end of the reaction path a foreign agent (7a) is added for cooling.

LIST OF REFERENCE NUMBERS AND DESIGNATIONS

1 Reaction chamber for gasification
1a Head of reaction chamber
2 Pressure-tight jacket vessel
3 Burner guns for solid carbon-containing fuel
3a Carbon-containing fuel in a mixture with an oxygen-containing gas
4 Burner guns for solid renewable raw material as fuel for a further burner level
4a Renewable fuel in a mixture with a water vapour-containing and oxygen-containing gas
4b Cooled slag deflector for protecting from down-flowing red-hot liquid slag
5 Discharge nozzle for syngas from the reaction chamber
5a Syngas exiting the reaction chamber
6 Collecting chamber for cooling the syngas
7 Feed nozzles for foreign agent of lower temperature
7a Vaporous, liquid or gaseous foreign agent
8 Water bath for solids to be removed
9 Discharge nozzle for water and solids to be removed
10 Lateral discharge nozzle for cooled syngas
11 Quench chamber
11a Discharge tube from the reactor for syngas and solids
12 Feed nozzles for renewable fuel in quench chamber
12a Renewable fuel
13 Syngas
14 Flow direction of syngas into the reaction chamber
14a Flow direction of syngas when exiting the reaction chamber
14b Feed gas flow of syngas into quench chamber
15 Wall projection in reaction chamber with flow restriction

The invention claimed is:

1. A process for the utilization of the enthalpy of a synthesis gas by additional and post-gasification of renewable fuels, comprising:
    introducing finely ground, carbon-containing fuel in a mixture with oxygen or an oxygen-enriched gas from the outside concentrically in a horizontal direction or from the top downwards into a first refractory reaction chamber so that the fuel reacts to synthesis gas in an entrained-flow gasification in the first reaction chamber, wherein the finely ground, carbon-containing fuel is introduced into the first reaction chamber on a first burner level which extends, in direction of the synthesis gas flow, across a front section of the overall height of the first reaction chamber;
    obtaining the synthesis gas at a pressure of 0.1 to 8 MPa and discharging it from the first reaction chamber in an upward or downward direction;
    after having been discharged, passing the synthesis gas thus obtained into a second reaction chamber which is designed as a collecting chamber and in which the supplied synthesis gas is mixed for cooling purposes with a gaseous, vaporous or liquid substance of lower temperature, wherein the residence time of the synthesis gas after the introduction of the fuel in the entrained flow and before the entry into the downstream collecting chamber for cooling in the entrained flow ranges between 1 and 10 seconds; and
    on a second or further burner level or a second or further burner gun level which also extends across a section of the overall height of the reaction path and is arranged, in the direction of the synthesis gas flow, downstream of the first burner level, a renewable fuel is introduced concentrically into the first reaction chamber, producing another entrained-flow gasification by which the temperature of the exiting synthesis gas is reduced and the enthalpy difference is utilized for the additional gasification of renewable raw materials.

2. The process for the utilization of the enthalpy of a synthesis gas by additional and post-gasification of renewable fuels according to claim 1, wherein the renewable fuel is introduced into the first reaction chamber in a mixture with a water vapour-containing or oxygen-containing gas, water vapour, or an oxygen-containing gas and water vapour.

3. The process for the utilization of the enthalpy of a synthesis gas by additional and post-gasification of renewable fuels according to claim 1, wherein the residence time of the synthesis gas after the introduction of the renewable fuel and before the entry into a collecting chamber for cooling in the entrained flow downstream of the reactor ranges between 2 and 5 seconds.

4. The process for the utilization of the enthalpy of a synthesis gas by additional and post-gasification of renewable fuels according to claim 1, wherein the temperatures in the collecting chamber range between 1400 and 1600° C. at the feed point for the renewable fuel.

5. The process for the utilization of the enthalpy of a synthesis gas by additional and post-gasification of renewable fuels according to claim 1, wherein the carbon-containing fuel is introduced into the first reaction chamber by tangentially arranged feed devices of the first burner level so to provide the carbon-containing fuel with a twist which will increase the residence time of the fuel in the reactor.

6. The process for the utilization of the enthalpy of a synthesis gas by additional and post-gasification of renewable fuels according to claim 1, wherein the synthesis gas is passed via a discharge tube into a quench chamber, and a renewable fuel is introduced concentrically into the quench chamber via burners in the quench chamber so to achieve a further reaction with the synthesis gas and thus a further reduction of the temperature of the synthesis gas.

7. The process for the utilization of the enthalpy of a synthesis gas by additional and post-gasification of renewable fuels according to claim 6, wherein the renewable fuel is introduced first into the quench chamber in flow direction of the gas and then the gaseous, vaporous or liquid agent is injected.

8. The process for the utilization of the enthalpy of a synthesis gas by additional and post-gasification of renewable fuels according to claim 1, wherein the renewable fuel is introduced into the reaction chamber or the quench chamber by tangentially arranged feed devices so that the renewable fuel is given a twist which will increase the residence time of the renewable fuel in the reactor or the quench chamber.

9. The process for the utilization of the enthalpy of a synthesis gas by additional and post-gasification of renewable fuels according to claim 1, wherein chopped, shredded, finely ground energy plants, wood of any form, straw, grass, cereals, biological residues, ocean plants or cattle dung are used as renewable fuel.

10. The process for the utilization of the enthalpy of a synthesis gas by additional and post-gasification of renewable fuels according to claim 1, wherein the renewable raw materials are submitted to a pre-treatment prior to the gasification, the pre-treatment steps including drying, carbonization, grinding or a combination of these steps.

11. The process for the utilization of the enthalpy of a synthesis gas by additional and post-gasification of renewable fuels according to claim 1, wherein renewable fuels in a mixture with carbon-containing fuels are used as fuel for the burners of the second burner level or in the quench chamber.

12. The process for the utilization of the enthalpy of a synthesis gas by additional and post-gasification of renewable fuels according to claim 11, wherein renewable raw materials in a mixture with carbon-containing fuels are used as fuel for the first and the second burner level in the reaction vessel and for the burners in the quench chamber, the mixing ratios being different.

* * * * *